H. G. ROSKIND.
EYEGLASS MOUNTING.
APPLICATION FILED JAN. 23, 1909.
923,080.
Patented May 25, 1909.
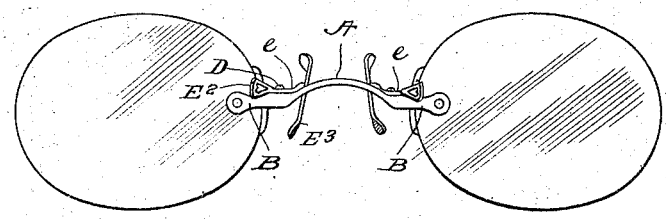
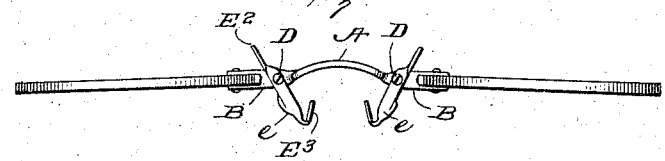
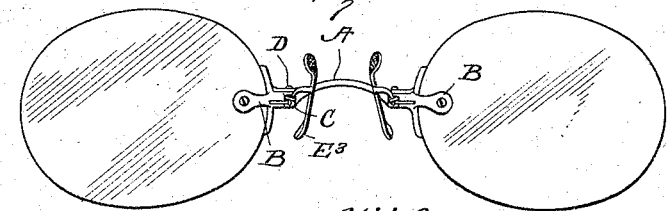
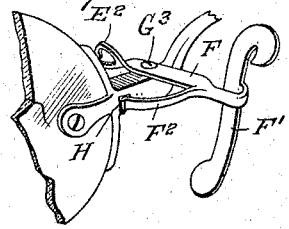
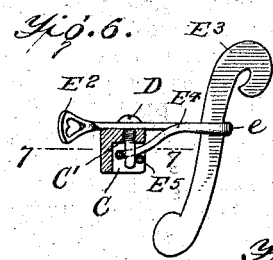
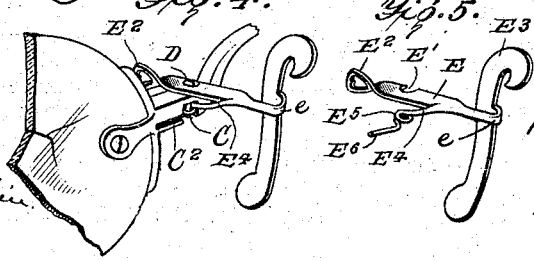
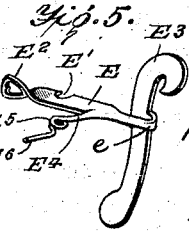
WITNESSES
INVENTOR
HERMAN G. ROSKIND,
BY
ATTORNEYS

UNITED STATES PATENT OFFICE.

HERMAN GUSS ROSKIND, OF COLUMBIA, TENNESSEE.

EYEGLASS-MOUNTING.

No. 923,080.      Specification of Letters Patent.      Patented May 25, 1909.

Application filed January 23, 1909. Serial No. 473,876.

*To all whom it may concern:*

Be it known that I, HERMAN GUSS ROSKIND, a citizen of the United States, and a resident of Columbia, in the county of Maury and State of Tennessee, have made certain new and useful Improvements in Eyeglass-Mountings, of which the following is a specification.

This invention is an improvement in eyeglass mountings, and particularly in that class of said devices in which the guards are pivotally mounted and spring actuated and can be opened for the application of the guards to the nose of the wearer and then released to engage by a spring action with the nose; and the invention consists in certain novel constructions and combinations of parts as will be hereinafter described and claimed.

In the drawing, Figure 1 is a front elevation, and Fig. 2 is a top plan view of a pair of eyeglass mountings embodying the invention. Fig. 3 is a rear elevation thereof. Fig. 4 is a detail perspective view from the rear side showing one of the guards and its connection with the bridge. Fig. 5 is a detail perspective view of one of the guards detached. Fig. 6 is a transverse section drawn alongside the pivot of one of the guards. Fig. 7 is a detail horizontal section on about line 7—7 of Fig. 6, and Fig. 8 shows a somewhat different construction within the broad principles of the invention.

In carrying out the invention it is sought to provide a construction whereby the actuating spring of the guards will be concealed from view from the front, and will only be exposed to view from the rear of the mounting, the view from the front showing simply the bridge and the guards without the guard actuating spring. In securing this result the spring at its free end is seated in a groove or recess in the rear face of the bridge.

In the construction shown in Figs. 1 to 7 inclusive, the bridge A is provided at its ends with lens holders B, rigid with the bridge, and in the rear face of the bridge adjacent to the opposite lens holders there are formed recesses C, which are alike except that they are rights and lefts, and each of the said recesses C, is open at the bottom and rear side, is intersected through its top wall by a bolt hole C', and has a communicating lateral extension or groove C² which extends outwardly toward the lens at the corresponding end of the bridge. The opening C' is threaded to receive the bolt D, and the said bolt receives the notch or bearing opening E' in the guard with the head of the bolt overlying the said guard and securing the same as will be understood from Figs. 4 and 6 of the drawing. The guard E has a main body portion, provided with the bearing or opening E', and at the front end of the main bar is formed a handle E² for convenience in operating the guard, and the rear end of the guard is provided with a pad or bearing plate E³ to engage the nose of the wearer.

The guard is provided on its outer side or side next the lens with a spring E⁴, preferably integral and formed by bifurcating the main bar of the guard, and this spring E⁴, has a general direction laterally to the main bar, is coiled between its ends at E⁵ and has its extremity E⁶ extended beyond its coil as best shown in Figs. 4 and 5 of the drawing. The coil E⁵ fits within the recess C and has the free end or extension E⁶ within the groove C² as shown in Figs. 4 and 7, and the bearing E' being preferably a notch opening at the side of the main bar opposite the spring E⁴ is held by the connection of the spring E⁴ with the bolt D in connection with the said pivot bolt D, as will be understood from Figs. 4 and 5 of the drawing.

When the parts are assembled as shown in Figs. 4, 6 and 7, the bolt D extends down through the body wall of the recess C and thence through the coil E⁵ of the spring, the extension E⁶ of the spring lying within the recess or groove C². When the parts are thus arranged it will be noticed that the spring will actuate the guard to cause it to press yieldingly toward the opposing guard, so that the guards will lie normally comparatively close together, but may be spread apart by pressing the handle portions E² of the opposite guards toward each other in fitting the mounting to the nose, when by freeing the handle portion E² the pads or bearing plates will grip the nose between them. The arrangement of the recesses C and the spring of the opposite mountings is such that they are excluded from view and cannot be seen from the front of the mountings, thus avoiding any unusual appearance at the front of the mountings, which is highly desirable in this class of devices.

In Fig. 8 is shown a construction within some of the broad principles of the invention, but differing somewhat in detail construction. In this construction, shown in Fig. 8, the guard F, is pivoted at $G^3$, and has the front handle portion, and a bearing plate F' at its rear end, and the main bar of the guard is bifurcated forming a spring $F^2$ whose free extremity seats in a groove or recess H in the rear face of the bridge. In this construction as in that shown in the other figures, the spring and the recess receiving the same are formed in rear of the bridge and excluded from view from the front.

In the construction shown in Figs. 1 to 7, inclusive, the guards can be conveniently removed by lifting the extremities $E^6$ of the spring out of the groove $C^2$, sliding the main bar of the guard at E' out of engagement with the bolt D and lowering the coil $E^5$ off the lower end of the bolt D and the guards can be applied by reversing this operation, which can be quickly accomplished whenever desired.

As best shown in Figs. 2, 4, and 5, the main bar is returned at its rear end at $e$, and the bearing plate $E^3$ is carried by the return portion. This is useful and important in fitting the bearing plates to the nose of the wearer as it permits of the bending of the mounting not only as to the bearing plate $E^3$ but also as to the connection of said bearing plate with the lever E supporting the said bearing plate. I am thus able to secure an accurate fitting of the bearing plate by this special construction of the return portion of the support for said plate, as shown at $e$ and before described.

What is claimed is—

1. An eyeglass mounting comprising a bridge, provided in its rear face near its end with a recess open at its rear and bottom sides, and with a groove leading from the said recess toward the end of the bridge and in the rear face of the latter, and with a bolt hole in the upper wall of said recess and leading thereto, a bolt in said hole and having a head above the bridge and its body portion extending in the said recess, a guard having a body portion notched in its inner face to fit the said bolt and underlying the head thereof, and having in rear of said notch an integral laterally extending spring coiled between its ends, and having its coiled portion fitting in the recess of the bridge and in position to receive the said bolt and having an extension beyond the said coil seating in the groove leading from the said recess, substantially as set forth.

2. An eyeglass mounting comprising a bridge having in its rear face a recess excluded from view from the front of the bridge, and a guard having a main bar pivoted to the bridge, and an integral spring held in the said recess, substantially as set forth.

3. An eyeglass mounting comprising a bridge having in its rear face a recess excluded from view from the front, and also having a pivot bolt extending through the top wall of said recess and projecting into the said recess, and a bridge having a main bar pivoted on the said bolt above the bridge, and a spring in connection with said main bar and having a coiled portion held by the bolt within the recess, substantially as set forth.

4. An eyeglass mounting comprising a bridge having in its rear face a recess excluded from view from the front, and a guard having a main bar pivoted to the bridge and provided with a spring projecting into the said rear recess of the bridge, substantially as set forth.

5. An eyeglass mounting comprising a bridge having in its rear face a recess excluded from view from the front, and a guard having a main bar pivoted to the bridge, and provided with a spring coiled between its ends with its coiled portion fitting within the recess of the bridge, and also having an extension beyond the said coil, and a bolt extending from the bridge into the said coil within the recess of the bridge, substantially as set forth.

HERMAN GUSS ROSKIND.

Witnesses:
R. E. HAYNES,
J. B. O'NEAL.